(12) United States Patent
Smith et al.

(10) Patent No.: US 9,174,802 B2
(45) Date of Patent: Nov. 3, 2015

(54) BULK MATERIALS TRANSFER CHUTE LINING

(71) Applicants: Christopher Scott Smith, Huntington, WV (US); Glenn Edward Farrow, Barboursville, WV (US)

(72) Inventors: Christopher Scott Smith, Huntington, WV (US); Glenn Edward Farrow, Barboursville, WV (US)

(73) Assignee: Richwood Industries, Huntington, WV (US)

( * ) Notice: Subject to any disclaimer, the term of this patent is extended or adjusted under 35 U.S.C. 154(b) by 0 days.

(21) Appl. No.: 14/578,012

(22) Filed: Dec. 19, 2014

(65) Prior Publication Data

US 2015/0175355 A1 Jun. 25, 2015

Related U.S. Application Data

(60) Provisional application No. 61/919,269, filed on Dec. 20, 2013.

(51) Int. Cl.
 *B65G 11/16* (2006.01)

(52) U.S. Cl.
 CPC ................... *B65G 11/166* (2013.01)

(58) Field of Classification Search
 CPC ................ B65G 11/166; B65G 11/163
 USPC ............... 193/2 R, 4, 5, 33; 198/957
 See application file for complete search history.

(56) References Cited

U.S. PATENT DOCUMENTS

| | | | |
|---|---|---|---|
| 3,954,694 A | 5/1976 | Hallstrom et al. | |
| 4,328,957 A * | 5/1982 | LaBate | 266/196 |
| 4,529,660 A * | 7/1985 | Heim | 428/423.1 |
| 5,038,924 A | 8/1991 | Stoll | |
| 5,103,967 A | 4/1992 | Stoll | |
| 5,267,642 A | 12/1993 | Gharpurey et al. | |
| D381,174 S | 7/1997 | Stoll | |
| D381,175 S | 7/1997 | Stoll | |
| 5,735,377 A * | 4/1998 | Herren | 193/33 |
| 6,041,906 A | 3/2000 | Howard | |
| 6,196,370 B1 * | 3/2001 | Beale et al. | 193/2 R |
| 6,250,450 B1 | 6/2001 | Howard | |
| 6,257,390 B1 | 7/2001 | Tehrani | |
| 6,367,606 B1 * | 4/2002 | Skalla et al. | 193/6 |
| 6,684,999 B1 * | 2/2004 | Howard | 193/2 R |
| 6,763,935 B2 | 7/2004 | Ostman | |
| 6,928,944 B2 | 8/2005 | Stoll | |
| D543,002 S | 5/2007 | Streszoff | |
| 7,232,023 B2 | 6/2007 | Ellis et al. | |
| 7,571,802 B2 | 8/2009 | Bowman | |
| 7,837,020 B2 * | 11/2010 | Pittman | 193/2 R |

(Continued)

FOREIGN PATENT DOCUMENTS

WO WO 2014/167572 A1 10/2014

*Primary Examiner* — Douglas Hess
(74) *Attorney, Agent, or Firm* — Waters Law Group, PLLC; Robert R. Waters; Brian W. Foxworthy

(57) ABSTRACT

A wear and shock resistant multi-strata panel for lining a conveyor chute bearing aggregate, coal, and other bulk materials. The panel comprises a plurality of generally planar layers, and a plurality of panels may be used to line a chute. The layers are comprised of and sequentially arranged in a topmost ceramic layer, a corrosion-resistant first metallic layer, an elastomeric cushioning layer, and a bottom-most corrosion-resistant second metallic layer proximal to and in intimate contact with the chute support structure, or chute surface. The layers are consecutively bonded together to form a panel attached integrally to the chute structure.

22 Claims, 2 Drawing Sheets

(56) References Cited

U.S. PATENT DOCUMENTS

| | | | |
|---|---|---|---|
| 7,980,377 B2 * | 7/2011 | Ellis et al. | 193/2 R |
| 8,006,830 B2 * | 8/2011 | Swinderman | 198/836.1 |
| 8,021,738 B2 * | 9/2011 | Yaver et al. | 428/119 |
| 8,033,386 B2 | 10/2011 | Roseberry et al. | |
| 8,485,336 B2 * | 7/2013 | Tenold et al. | 193/33 |
| 8,708,391 B2 * | 4/2014 | Dunn et al. | 296/39.2 |
| 8,822,008 B2 * | 9/2014 | Keough | 428/99 |
| 2006/0237280 A1 * | 10/2006 | Ellis et al. | |
| 2011/0151177 A1 * | 6/2011 | Stackpole | |

* cited by examiner

BULK MATERIALS TRANSFER CHUTE LINING

CROSS-REFERENCE TO RELATED APPLICATION

This application claims the priority benefit of U.S. Provisional Patent Application Ser. No. 61/919,269, "Bulk Materials Transfer Chute Lining", filed Dec. 20, 2013 which is hereby expressly incorporated by reference herein in its entirety.

TECHNICAL FIELD

The present application generally relates to a chute or a lining for a chute component of a conveyor unit transporting bulk products. More particularly, the present application relates to a layered chute or chute lining for reducing wear and maintenance to a conveyor chute transporting granular coal, coke, aggregate, or other bulk product.

BACKGROUND

The handling of bulk products in industries such as mining or package shipping involve transporting or moving products along a conveyor unit. For example, in the coal mining industry, a conveyor unit is a linking piece in the coal-handling chain. The components of a conveyor unit include conveyor belts and conveyor chutes. A typical part of the coal-handling process involves using an input chute to deliver mined coal to a conveyor belt, then transporting the coal to a discharge chute. Both the input chute and discharge chute include a sloping metallic trough or slideway having an angle of repose adjustable to suit the desired speed at which the coal, via gravitational inducement, will traverse the input chute to be loaded onto the conveyor belt and traverse the discharge chute in the course of being directed to storage or shipping processes.

The chute itself is sometimes made of manganese steel for heavy impacts, or high chrome steel or chrome molybdenum where only sliding abrasion is the problem. However, an unlined metallic chute may nonetheless incur wear damage fairly quickly due to impact, abrasion, and twisting forces imposed by coal and other bulk materials. In some operations, this problem is addressed by adding a protective lining to the chute.

As is well-known in the art, ceramic brick chute liners are frequently used to provide resistance against wear and abrasion. To achieve this objective, ceramic brick lining may be comprised of aluminum nitride, zirconia, alumina, or other inorganic, non-metallic solid material. It is also common practice for the ceramic layer to overlie a cushioning substrate of resilient rubber to protect against wear caused by impact energies. Rubber lining can be vulcanized onto chute surfaces, or adhered in sheets to chute surfaces. The thickness of the lining, as well as "shore hardness", may be varied depending on the size of the product particles and the drop distance from conveyor to chute.

However, the flexibility of the rubber layer may not provide sufficient resistance to chute twisting, which is a significant contributing factor to the wear of the lining itself. Also, the insulation characteristics of the rubber layer may prompt the occasional need for radiant heaters in cold weather, to help protect against hardening of the rubber layer and consequent reduction of its shock-absorbing characteristics.

In addition, abrasion-resistant ceramic liners have proven difficult to secure to a cushioning substrate so as to form a protective lining that is sufficiently capable of enduring repeated surface impacts and abrasions. This results in dislodging of the ceramic tiles from the cushioning rubber substrate and increases the frequency with which the ceramic tiles need replacing. Therefore, there is a need to enhance the insulation characteristics of linings to mitigate against the hardening of the rubber layer in cold weather, while reducing the maintenance needs and resulting production costs associated with frequent ceramic tile replacement.

SUMMARY

In view of the foregoing disadvantages inherent in the ceramic and rubber liners now present in the art, this application provides novel impact, wear-resistance, and insulation characteristics for gravity-flow chutes used in conveyor systems involved in transfer of bulk materials. The application is capable of withstanding considerable impact energies and vibrations, while increasing insulation characteristics and thereby lessening the need for externally-supplied radiant energy.

These benefits are achieved with a chute or a chute liner comprising a plurality of panels, each individual panel having a rectangular and/or square geometric configuration, depending on the configuration requirements for securely and properly lining the conveyor chute. Each panel further comprises a plurality of coextensive, consecutively-arranged generally planar layers which work synergistically to protect the chute surface against wear.

According to one embodiment of the invention, a chute liner for use in lining the impact surface of a bulk material conveyor chute is set forth comprising a first layer, said first layer of ceramic material arranged for direct contact with the aggregate bulk material being moved through said chute. The embodiment is further comprised of a second layer, said second layer of metallic material disposed directly underneath said first layer and arranged to couple closely with said first layer. Next, a third layer is set forth, said third layer of elastomeric material disposed directly underneath said second layer and arranged to couple closely with said second layer. Finally, a fourth layer of material is found, said fourth layer of metallic material disposed directly underneath said third layer and arranged to couple closely with said chute.

According to another embodiment, a bulk material conveyor chute, rather than a chute liner is set forth. With that embodiment, the bulk material conveyor chute comprises a first layer, said first layer of ceramic material arranged for direct contact with the aggregate bulk material being moved through said chute. The chute is further comprised of a second layer, said second layer of metallic material disposed directly underneath said first layer and arranged to couple closely with said first layer. Next, a third layer of material is set forth in creating the chute, said third layer of elastomeric material disposed directly underneath said second layer and arranged to couple closely with said second layer. Finally, a fourth layer of material is disposed, said fourth layer of metallic material disposed directly underneath said third layer and constructed to provide structural rigidity to said chute.

The panel layers include an uppermost wear surface layer of abrasion-resistant ceramic modules comprised of, but not limited to, aluminum nitride, zirconia, alumina, or other ceramic. Immediately underlying the ceramic layer is a corrosion-resistant metallic stratum. The metallic stratum overlies a cushioning impact-resistant rubber stratum comprised of, but not limited to, polyvinyl chloride (PVC), polyethylene, polyurethane, or vulcanized rubber. The cushioning layer overlies a bottom-most stratum comprised of a second corrosion-resistant metallic layer that attaches directly to the surface of the bulk materials chute. The layers may be bound together and to the bulk materials chute in a variety of ways including the use of bolts or other fasteners, and by the use of adhesives such as, but not limited to, epoxy, urethane, Portland cement, polyesters, and silicone-based adhesives.

BRIEF DESCRIPTION OF THE DRAWINGS

Additional utility and features of the device of the present application will become more fully apparent to those skilled in the art by reference to the following drawings, which illustrate some of the primary features of some of the embodiments.

DETAILED DESCRIPTION

Figure 1:
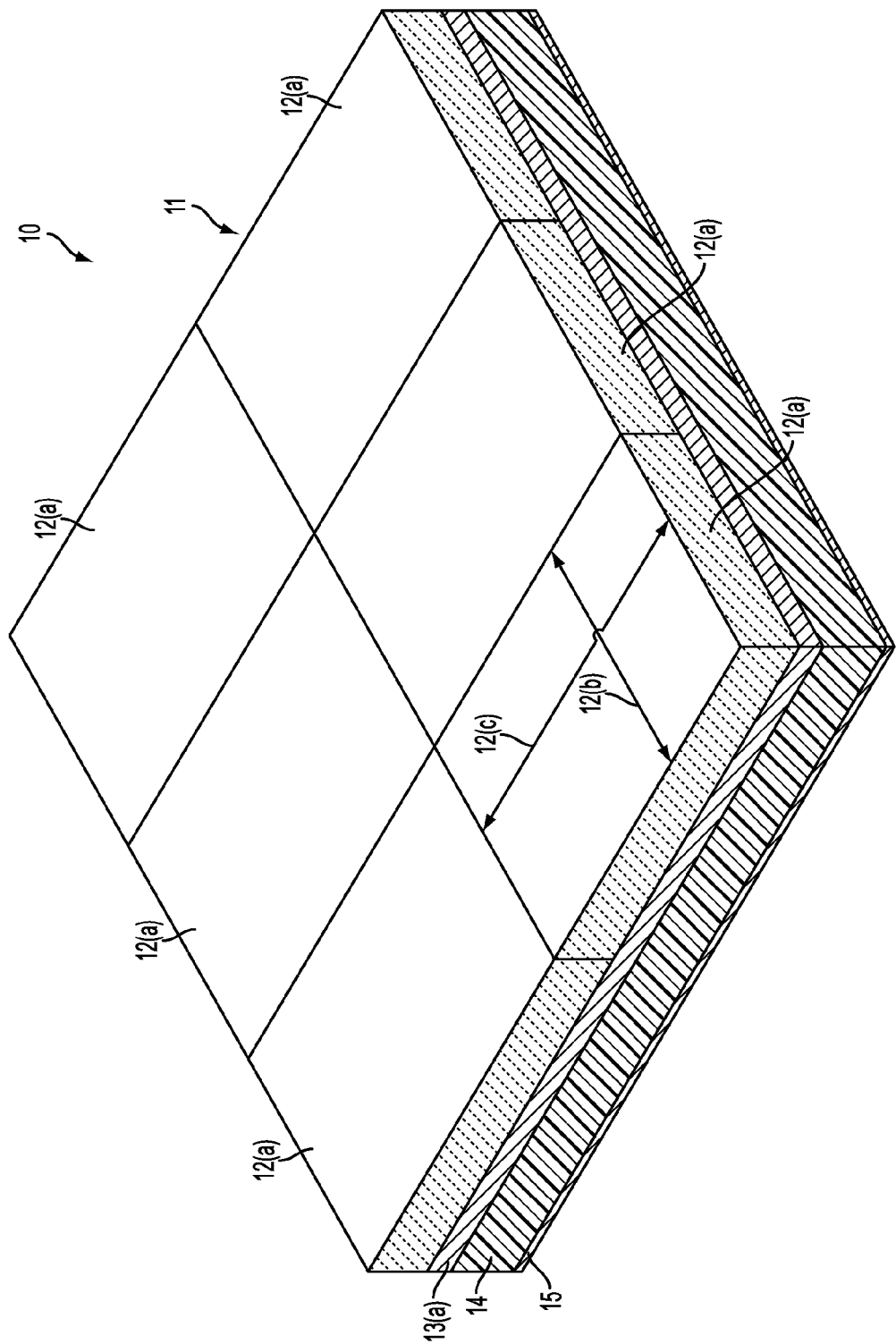
FIG. 1 is a perspective top view of an embodiment of the panel described herein.

With reference to FIG. 1, a multi-layered panel 10 is disclosed. The lining of an embodiment of the present application comprises a topmost layer 11 of ceramic brick, typically formed of a molded and fired material such as, but not limited to, alumina, aluminum nitride, zirconia, or other ceramic material. The composition and/or thickness of topmost layer 11 may be varied in accordance with desired impact resistance and material flow velocity characteristics. The features and function of ceramic brick are known to those of ordinary skill in the art, and thus need not be described in detail herein.

Topmost layer 11 in FIG. 1 is comprised of a plurality of segments 12(a) arranged so that the peripheral surface of topmost layer 11 directly exposed to impact from bulk materials is substantially smooth. In the embodiment shown in FIG. 1, the two-dimensional geometric configuration of segment 12(a), based on width 12(b) and length 12(c), approximates a rectangle. In some embodiments, the two-dimensional geometric configuration of segment 12(a) is approximately square. In some embodiments, a plurality of segments 12(a) combines individual segments having an approximately rectangular geometric configuration with individual segments 12(a) having an approximately square geometric configuration. In other embodiments, other shapes of the segments may be used.

The embodiment of panel 10 in FIG. 1 has second layer 13(a) directly underlying topmost layer 11. In the embodiment shown in FIG. 1, second layer 13(a) is comprised of, but not limited to, stainless steel or other corrosion-resistant metal. Second layer 13(a) is proximal to, and in intimate contact with, the underside of topmost layer 11. Second layer 13(a) operates to reinforce topmost layer 11 against twisting and vibration forces, and to enhance the insulation characteristics of panel 10.

Figure 2:
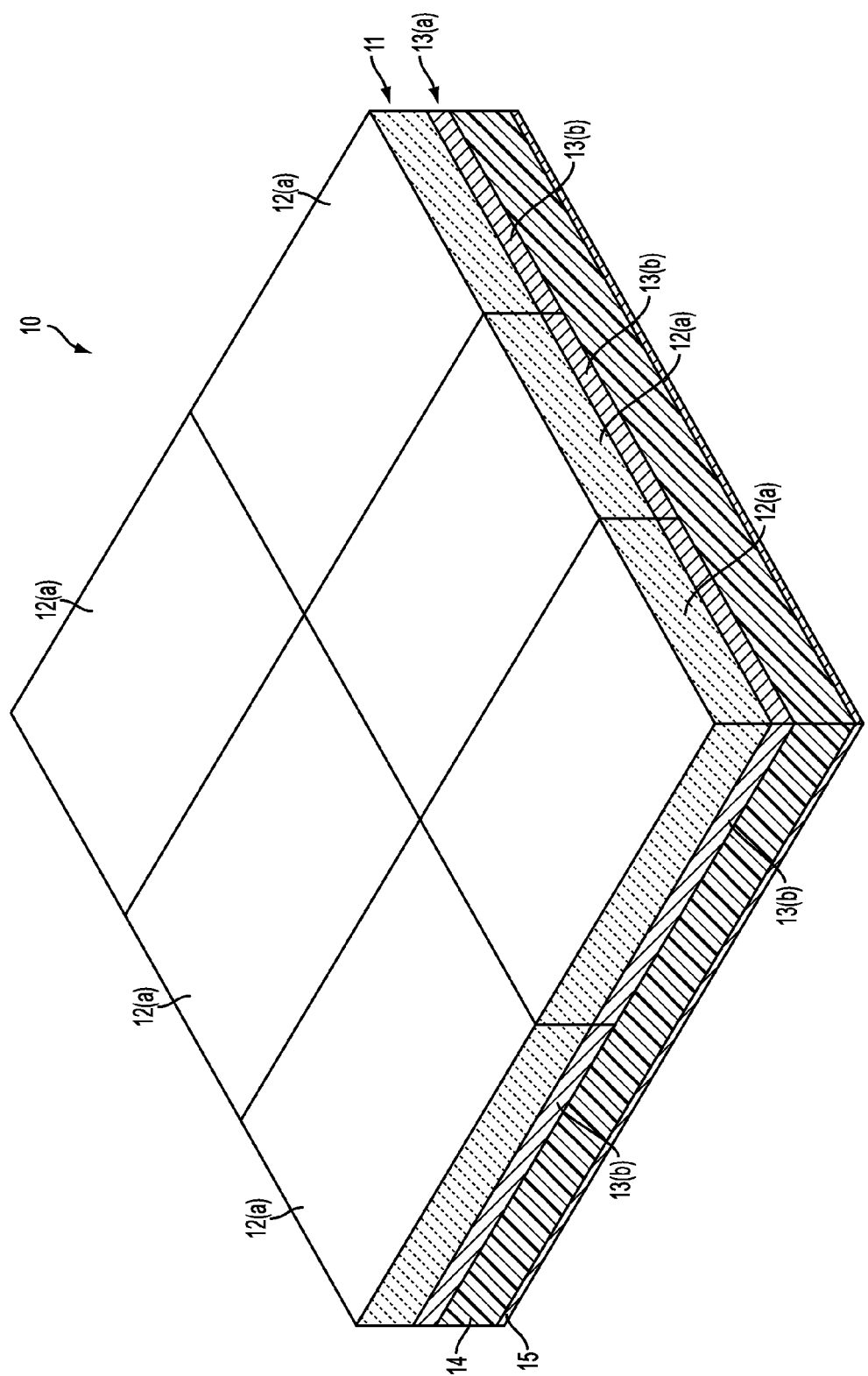
FIG. 2 is a perspective top view of another embodiment of the panel described herein.

The embodiment of FIG. 1 discloses panel 10 having second layer 13(a) comprised of a single piece/unit. Referring to FIG. 2, in some embodiments second layer 13(a) of panel 10 is comprised of a plurality of sections 13(b), having a number complimentary to the number of segments 12(a) and arranged so that each individual section has a two-dimensional geometry that describes and aligns with the two-dimensional geometry of the individual segment 12(a) of topmost layer 11 that overlies it. In the embodiment of panel 10 shown in FIG. 2, when the conveyor chute is subjected to twisting forces, this arrangement allows second layer 13(a) to move in substantial synchrony with topmost layer 11, thus protecting against the dislodging of one or more segments 12(a) of topmost layer 11.

Referring to the embodiments in FIGS. 1 and 2, second layer 13(a) overlies third layer 14 comprising a stratum of shock-absorbing elastomeric material. The third layer may be comprised of, but not limited to, vulcanized rubber, epoxy, polyester, or urethane. The shock-absorbency of third layer 14 has the benefit of extending the useful life of panel 10, thus reducing the down-time required for maintenance caused by wear to panel 10. Adjustments in the thickness of second layer 13(a) and/or the thickness and "shore hardness" of third layer 14 can be made to minimize or negate the degree to which the shock-absorbency benefits of third layer 14 are compromised by the presence of second layer 13(a).

Referring again to the embodiments in FIGS. 1 and 2, fourth layer 15 is shown. Fourth layer 15 is comprised of, but not limited to, stainless steel or other corrosion-resistant metal. The corrosion-resistant metal of which fourth layer 15 is comprised may be either the same as, or different from, that of which second layer 13(a) is comprised. Fourth layer 15 is sandwiched between, and in intimate contact with, the underside of third layer 14 and the surface of the bulk materials chute to which panel 10 adheres. Fourth layer 15 provides additional reinforcement against twisting forces, and further improves the insulation characteristics of panel 10.

It is to be understood that the embodiments herein are not limited in application to the details of construction and arrangement of the components set forth in the description and illustrated in the drawings. Rather, the description and the drawings provide examples of the embodiments envisioned, but the present device is not limited to any particular embodiment or to a preferred embodiment disclosed and/or identified in the specification. The drawing figures are for illustrative purposes only, and merely provide practical examples of the application disclosed herein. Therefore, the drawing figures should not be viewed as restricting the scope of the present application to that which the drawings depict.

The present application is further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments are based may be readily utilized as a basis for the design of other structures, methods, and systems. In addition, it is understood that the phraseology and terminology employed herein are for the purpose of description and should not be regarded as limiting the present application.

We claim:

1. A chute liner for use in lining the impact surface of a bulk material conveyor chute comprising:
    a) a first layer, said first layer of ceramic material arranged for direct contact with the aggregate bulk material being moved through said chute;
    b) a second layer, said second layer of metallic material disposed directly underneath said first layer and arranged to couple closely with said first layer;
    c) a third layer, said third layer of elastomeric material disposed directly underneath said second layer and arranged to couple closely with said second layer; and
    d) a fourth layer, said fourth layer of metallic material disposed directly underneath said third layer and arranged to couple closely with said chute.

2. The chute liner of claim 1 wherein said first layer is comprised of multiple, generally-planer panels of ceramic material arranged adjacent to each other.

3. The chute liner of claim 2 wherein said panels and said layers are attached by bolting them in place.

4. The chute liner of claim 2 wherein said panels and said layers are attached by the use of an adhesive.

5. The chute liner of claim 2 wherein said metallic layer is comprised of multiple, generally planer panels of metallic material arranged adjacent to each other, and wherein multiple panels of ceramic material are sized and arranged to directly overlay said multiple panels of metallic material.

6. The chute liner of claim 1 wherein said second layer is comprised of multiple, generally-planer panels of metallic material arranged adjacent to each other.

7. The chute liner of claim 1 wherein said panels of ceramic material are abrasion resistant and can be made of aluminum nitride, zirconia, or alumina.

8. The chute liner of claim 1 wherein said metallic layers are comprised of corrosion resistant metal.

9. The chute liner of claim 1 wherein:
   a) said first layer of ceramic material comprises a plurality of segments;
   b) said second layer of metallic material comprises a plurality of sections; and
   c) the number of said sections is complementary to the number of said segments.

10. The chute liner of claim 9 wherein each segment of said first layer is aligned with a respective section of said second layer.

11. The chute liner of claim 9 wherein each of said segments has a rectangular shape.

12. A bulk material conveyor chute comprising:
   a) a first layer, said first layer of ceramic material arranged for direct contact with the aggregate bulk material being moved through said chute;
   b) a second layer, said second layer of metallic material disposed directly underneath said first layer and arranged to couple closely with said first layer;
   c) a third layer, said third layer of elastomeric material disposed directly underneath said second layer and arranged to couple closely with said second layer; and
   d) a fourth layer, said fourth layer of metallic material disposed directly underneath said third layer and constructed to provide structural rigidity to said chute.

13. The chute of claim 12 wherein said first layer is comprised of multiple, generally-planer panels of ceramic material arranged adjacent to each other.

14. The chute of claim 13 wherein said panels and said layers are attached by bolting them in place.

15. The chute of claim 13 wherein said panels and said layers are attached by the use of an adhesive.

16. The chute of claim 13 wherein said multiple panels of ceramic material are sized and arranged to directly overlay said multiple panels of metallic material.

17. The chute of claim 13 wherein said panels of ceramic material are abrasion resistant and can be made of aluminum nitride, zirconia, or alumina.

18. The chute of claim 13 wherein said metallic layers are comprised of corrosion resistant metal.

19. The chute of claim 12 wherein said second layer is comprised of multiple, generally-planer panels of metallic material arranged adjacent to each other.

20. The chute of claim 12 wherein:
   d) said first layer of ceramic material comprises a plurality of segments;
   e) said second layer of metallic material comprises a plurality of sections; and
   f) the number of said sections is complementary to the number of said segments.

21. The chute of claim 20 wherein each segment of said first layer is aligned with a respective section of said second layer.

22. The chute liner of claim 20 wherein each of said segments has a rectangular shape.

* * * * *